United States Patent
Tomkins et al.

(10) Patent No.: US 10,791,026 B2
(45) Date of Patent: Sep. 29, 2020

(54) SYSTEMS AND METHODS FOR ADAPTIVE OVER-THE-TOP CONTENT QUALITY OF EXPERIENCE OPTIMIZATION

(71) Applicant: Ciena Corporation, Hanover, MD (US)

(72) Inventors: Robert Kevin Tomkins, Nepean (CA); Glenn Calafati, Kings Park, NY (US)

(73) Assignee: Ciena Corporation, Hanover, MD (US)

(*) Notice: Subject to any disclaimer, the term of this patent is extended or adjusted under 35 U.S.C. 154(b) by 250 days.

(21) Appl. No.: 15/348,387

(22) Filed: Nov. 10, 2016

(65) Prior Publication Data
US 2018/0131580 A1    May 10, 2018

(51) Int. Cl.
*H04L 29/08* (2006.01)
*H04L 12/24* (2006.01)
*H04L 12/26* (2006.01)

(52) U.S. Cl.
CPC ........ *H04L 41/0823* (2013.01); *H04L 41/142* (2013.01); *H04L 67/2842* (2013.01); *H04L 67/2852* (2013.01); *H04L 41/0883* (2013.01); *H04L 41/0886* (2013.01); *H04L 41/5067* (2013.01); *H04L 43/08* (2013.01)

(58) Field of Classification Search
CPC ............. H04L 41/5009; H04L 41/0883; H04L 41/0896; H04L 43/08; H04L 67/2842; H04L 41/0823; H04L 41/142; H04L 67/2852; H04L 41/0886; H04L 41/5067; H04L 41/509
USPC ........................................................ 709/224
See application file for complete search history.

(56) References Cited

U.S. PATENT DOCUMENTS

| | | | |
|---|---|---|---|
| 2002/0048269 A1* | 4/2002 | Hong | H04L 29/06 370/389 |
| 2009/0083279 A1* | 3/2009 | Hasek | H04L 67/2823 |
| 2010/0260074 A1* | 10/2010 | Blouin | H04L 12/462 370/260 |
| 2011/0179186 A1* | 7/2011 | Li | H04L 65/4084 709/231 |
| 2011/0267951 A1* | 11/2011 | Stanwood | H04L 41/5022 370/235 |
| 2011/0280216 A1 | 11/2011 | Li et al. | |
| 2013/0148525 A1* | 6/2013 | Cuadra Sanchez | H04L 41/147 370/252 |

(Continued)

FOREIGN PATENT DOCUMENTS

| | | |
|---|---|---|
| WO | 2016/095943 A1 | 6/2016 |
| WO | 2016/119822 A1 | 8/2016 |

*Primary Examiner* — Thomas J Dailey
*Assistant Examiner* — Lam H Duong
(74) *Attorney, Agent, or Firm* — Clements Bernard Walker; Lawrence A. Baratta, Jr.; Christopher L. Bernard (57) ABSTRACT

Systems and methods for adaptive Over-the-Top (OTT) content optimization based on Quality of Experience (QOE) are implemented in an OTT optimization platform communicatively coupled to a plurality of devices in a network. The system and methods include receiving a plurality of inputs comprising network inputs, service and software inputs, and QOE inputs; analyzing the plurality of inputs with respect to one or more OTT content streams to perform an optimization thereof; determining adjustments in the network based on the optimization; and one of notifying a network operator of the adjustments and automatically causing the adjustments in the network.

18 Claims, 4 Drawing Sheets

(56) References Cited

U.S. PATENT DOCUMENTS

| | | | |
|---|---|---|---|
| 2013/0165084 A1* | 6/2013 | Xu | H04N 21/235 |
| | | | 455/414.1 |
| 2014/0286177 A1 | 9/2014 | Ni et al. | |
| 2014/0341026 A1* | 11/2014 | Gahm | H04L 47/76 |
| | | | 370/232 |
| 2015/0003831 A1 | 1/2015 | Moulton et al. | |
| 2015/0127805 A1 | 5/2015 | Htay et al. | |
| 2015/0172345 A1 | 6/2015 | Mantin et al. | |
| 2015/0249585 A1* | 9/2015 | Shomura | H04L 67/02 |
| | | | 709/224 |
| 2016/0028595 A1* | 1/2016 | Ramakrishnan | H04L 41/5025 |
| | | | 709/226 |
| 2016/0072669 A1 | 3/2016 | Saavedra | |
| 2016/0112894 A1* | 4/2016 | Lau | H04W 24/10 |
| | | | 370/252 |
| 2016/0218912 A1* | 7/2016 | Vincze | H04L 41/0672 |
| 2016/0301593 A1 | 10/2016 | Blair et al. | |
| 2017/0244614 A1* | 8/2017 | Wu | H04L 41/0631 |

\* cited by examiner

SYSTEMS AND METHODS FOR ADAPTIVE OVER-THE-TOP CONTENT QUALITY OF EXPERIENCE OPTIMIZATION

FIELD OF THE DISCLOSURE

The present disclosure generally relates to networking systems and methods. More particularly, the present disclosure relates to systems and methods for adaptive Over-the-Top (OTT) content Quality of Experience (QOE) optimization.

BACKGROUND OF THE DISCLOSURE

OTT content includes delivery of audio, video, and/or other media over the Internet without the involvement of a Service Provider in the control or distribution of the content. The Service Provider (e.g., network operators, Multiple-System Operator (MSO), etc.) may be aware of the content of OTT-related packets, but generally is not responsible nor able to control, the viewing ability, copyright, or other redistribution of the content. OTT content is proliferating and expected to be the distribution model of the future. Conventionally, OTT content has followed a process of creating content and then publishing the content in a variety of encodings. The published content is then delivered through a plurality of networks such as the Internet, Private Networks, Content Providers (CP), Cloud Networking Providers, Content Distribution Networks (CDN), Internet Service Provider (ISP) networks, and the like. These networks have optical, packet, and higher layer components and capabilities to facilitate the delivery of the content to end clients. The popularity of content and user satisfaction is often tracked based on delivery server, social media, and other data. Programming departments may use this data to determine what content is most valued by an audience. At the same time, many of the networks involved in the delivery are often evaluated based on throughput, latency, availability, and susceptibility to attack.

For feedback, Quality of Experience (QOE) mechanisms have emerged that deliver user session specific detail by integrating functionality into the client video player which may be coupled with key information from the content provider. QOE is a measure of a customer's experiences with a service. QOE focuses on the entire service experience and is a more holistic evaluation than the more narrowly focused user experience (focused on a software interface) and customer-support experience (support focused).

QOE is just starting to be measured, but little is done with QOE except that the content provider may manually select an alternate CDN based on the QOE or adjust the configuration of the OTT Video Platform (OVP). Conventionally, OTT video QOE does not impact the optical or packet network configuration or the compute (such as Network Functions Virtualization (NFV)) infrastructure that may be the cause of the low QOE. This lack of QOE visibility and action at the optical, packet, or NFV components leads to higher cost and lower performance in OTT content delivery. When the source of the poor quality, for example, the physical network, cannot be adapted by the content provider, they will often choose to work around the problem (e.g., alternate CDN, buy dark fiber, etc.) which is ultimately more expensive. Of course, failure to act on the QOE problems in the network (optical, packet, compute, NFV, etc.) results in a lower performance solution.

Content providers and service providers with access to the QOE information may currently employ analysts to identify problems with published or cached information or with CDNs. The information is typically used to address customer complaints but may also result in manually changing the OVP configuration that controls the content publishing and CDN selection.

BRIEF SUMMARY OF THE DISCLOSURE

In an exemplary embodiment, a method for adaptive Over-the-Top (OTT) content optimization based on Quality of Experience (QOE) is implemented in an OTT optimization platform communicatively coupled to a plurality of devices in a network. The method includes receiving a plurality of inputs including network inputs, service and software inputs, and QOE inputs; analyzing the plurality of inputs with respect to one or more OTT content streams to perform an optimization thereof; determining adjustments in the network based on the optimization; and one of notifying a network operator of the adjustments and automatically causing the adjustments in the network. The network can include a plurality of an optical layer, a packet layer, a compute layer, and a video functions layer, and wherein the adjustments can include changes to one or more of i) physical and virtual network elements in the optical layer, ii) physical and virtual network elements in the packet layer, iii) servers and other compute elements in the compute layer, and iv) physical and virtual resources in the video functions layer. The network inputs and the service and software inputs can be received from a management plane, and wherein the QOE data is received from a database which manages the QOE data from players associated with user devices.

The network can include a combination of OTT delivery elements to end users and OTT content publishing elements to provide the OTT content streams to the network, and wherein the optimization can include evaluating tradeoffs for configured of the OTT delivery elements and the OTT content publishing elements based of a plurality of factors including revenue generation, cost, resource use, function, risk, location, and impact on user QOE. The receiving can be via one or more Application Programming Interfaces (APIs) from a management plane associated with the network or directly from the network. The QOE inputs can be related to one of an individual OTT content stream to a user, a selected representative OTT content stream to a selected user amongst a group of users associated with a corresponding group of OTT content streams, and an aggregate QOE for the group of OTT content streams, and wherein the adjustments correspond to one of the individual OTT content stream and the group of OTT content streams.

The adjustments can include a determination of caching in the network based on the OTT content to improve the QOE inputs. The determining can include a determination of a particular file for OTT content is improperly encoded on a cache, and wherein the adjustments can include deletion of the file and an increase of bandwidth back to an origin server until caching of the file stabilizes. The optimization can include an evaluation of various tradeoffs to determine the adjustments, and wherein the evaluation is based on the receiving, historical inputs, forecasted use, and user defined inputs. The tradeoffs can be based on QOE versus one or more of compute resources, bandwidth, latency, and encoding of the OTT content. The QOE data can be consolidated by a system receiving feedback from a plurality of players associated with user devices consuming the OTT content.

In another exemplary embodiment, an optimization platform adapted for Over-the-Top (OTT) content optimization based on Quality of Experience (QOE) includes a network interface communicatively coupled to a network; a processor communicatively coupled to the network interface; and memory storing instructions that, when executed, cause the processor to receive a plurality of inputs including network inputs, service and software inputs, and QOE inputs, analyze the plurality of inputs with respect to one or more OTT content streams to perform an optimization thereof, determine adjustments in the network based on the optimization, and one of notify a network operator of the adjustments and automatically cause the adjustments in the network. The network can include a plurality of an optical layer, a packet layer, a compute layer, and a video functions layer, and wherein the adjustments can include changes to one or more of i) physical and virtual network elements in the optical layer, ii) physical and virtual network elements network elements in the packet layer, iii) compute resources in the compute, and iv) physical video relevant appliances or video virtual functions in the video functions layer.

The network inputs and the service and software inputs can be received from a management plane, and wherein the QOE data is received from a database which manages the QOE data from players associated with user devices. The network can include a combination of OTT delivery elements to end users and OTT content publishing elements to provide the OTT content streams to the network, and wherein the optimization can include evaluating tradeoffs for configured of the OTT delivery elements and the OTT content publishing elements based of a plurality of factors including revenue generation, cost, resource use, function, risk, location, and impact on user QOE. The receiving can be via one or more Application Programming Interfaces (APIs) from a management plane associated with the network. The QOE inputs can be related to one of an individual OTT content stream to a user, a selected representative OTT content stream to a selected user amongst a group of users associated with a corresponding group of OTT content streams, and an aggregate QOE for the group of OTT content streams, and wherein the adjustments correspond to one of the individual OTT content stream and the group of OTT content streams. The optimization can include an evaluation of various tradeoffs to determine the adjustments, and wherein the evaluation is based on the receiving, historical inputs, forecasted use, and user defined inputs. The QOE data can be consolidated by a system receiving feedback from a plurality of players associated with user devices consuming the OTT content.

In a further exemplary embodiment, a non-transitory computer readable medium includes instructions executable by a processor, and in response to such execution causes the processor to perform operations including receiving a plurality of inputs including network inputs, service and software inputs, and QOE inputs; analyzing the plurality of inputs with respect to one or more OTT content streams to perform an optimization thereof; determining adjustments in the network based on the optimization; and one of notifying a network operator of the adjustments and automatically causing the adjustments in the network.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to systems and methods for adaptive Over-the-Top (OTT) Quality of Experience (QOE) optimization. The systems and methods cover the automated allocation and continually re-adjusted allocation of the resources (e.g., optical, packet, NFV, etc.) used for over the top (OTT) content publishing and delivery based on the user Quality of Experience and the network economics. This is a form of analytics. The systems and methods include an OTT optimization platform and OTT optimization process that closes a feedback loop between the QOE data and the underlying network. Various adjustments are contemplated herein to optimize OTT content delivery based on real-world QOE feedback.

OTT Content Creation to Delivery in a Network

Figure 1:
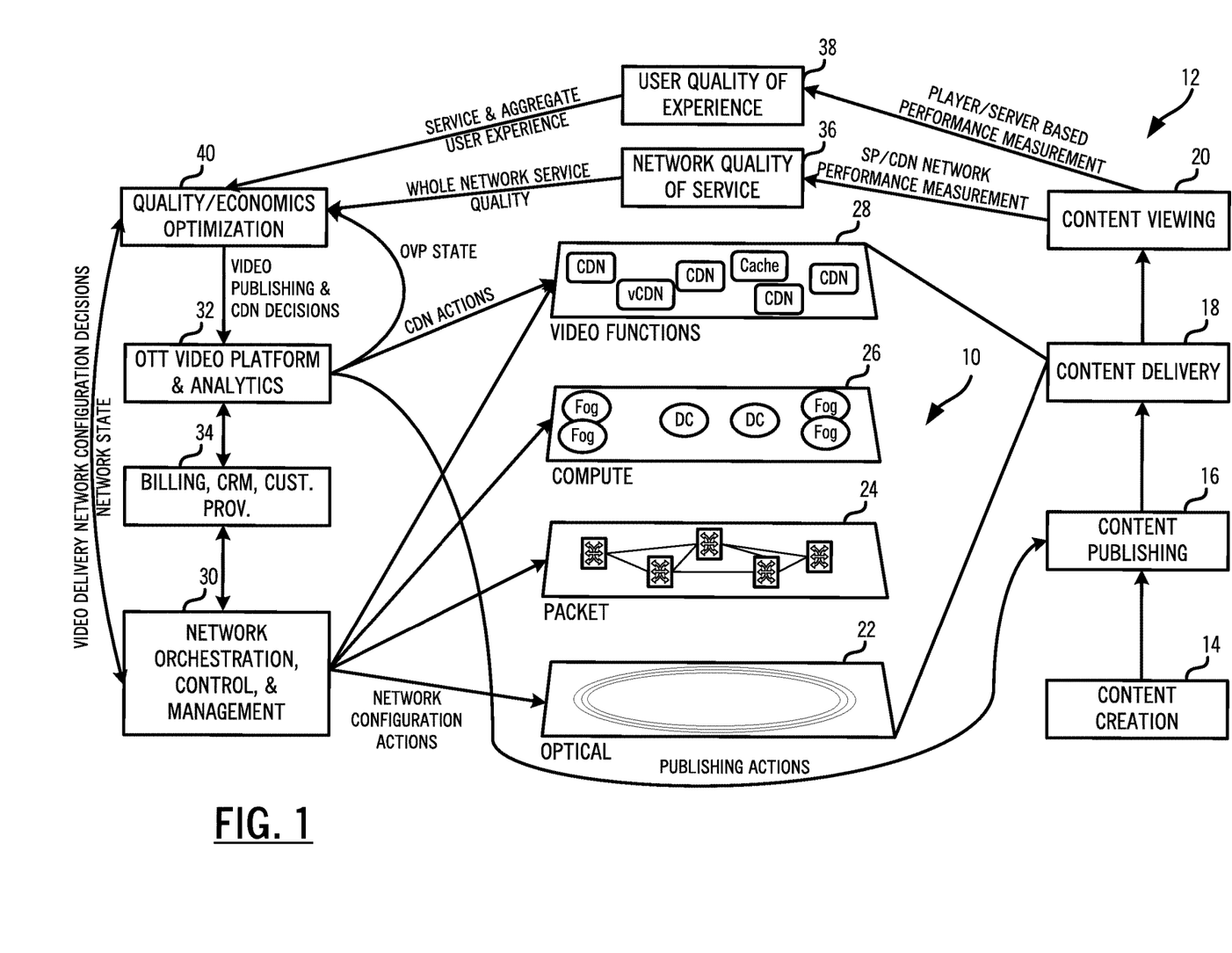
FIG. 1 is a network diagram and flow diagram of a network and OTT content process describing OTT content from creation to delivery.

Referring to FIG. 1, in an exemplary embodiment, a network diagram and flow diagram illustrate a network 10 and OTT content process 12 describing OTT content from creation to delivery. The OTT content process 12 includes four major steps for OTT content to end in the hands of the end user. Specifically, the OTT content process 12 includes content creation 14, content publishing 16, content delivery 18, and content viewing 20. The content creation 14 is where the OTT content, e.g., video, audio, etc., is recorded, generated, etc. The content publishing 16 is the process of preparing the OTT content for consumption and includes such aspects as encoding, static advertisement insertion, pricing, Digital Rights Management (DRM), user and device management, and the like. The content delivery 18 is the process of transmitting the OTT content from its origin or hosting location to the destination device. This can be performed live or on demand and can be streamed, where delivery is in parallel with viewing, or downloaded, where the OTT content is completely delivered prior to viewing. The content viewing 20 is the process of displaying or consuming the OTT content on a physical device.

The content delivery 18 is over the network 10 which includes one or more networks which can have different layers, such as an optical layer 22, a packet layer 24, a compute layer 26, and a video functions layer 28. The optical layer 22 can include optical network elements operating at Layer 0 (photonic—Dense Wave Division Multiplexing (DWDM)) and/or Layer 1 (Time Division Multiplexing (TDM) such as Optical Transport Network (OTN)). The packet layer 24 can include packet network elements such as switches, routers, etc. operating at Layer 2 and/or 3, such as Ethernet, Multiprotocol Label Switching (MPLS), Internet Protocol (IP), and the like. The compute layer 26 can include dedicated compute capable hardware and/or Virtual Network Functions (VNF) via compute elements which executed the VNFs in data centers, via fog computing, etc. The video functions layer 28 can perform content oriented software functions, such as Content Distribution Networks (CDN), virtual CDNs (vCDN), caching, etc.

The network elements and compute elements in the layers 22, 24, 26, 28 can be managed by a management plane 30 and an OTT Video Platform (OVP) and OTT analytics (OVA) platform 32. The management plane 30 can be one or more of a network orchestrator, Software Defined Networking (SDN) Controller, a Control Plane, or the like. If the management plane 30 include a network orchestrator, a Network Management System (NMS), and/or OVP, these devices can interface to a Billing, Customer Records Management (CRM), and Customer Provisioning system 34.

As the OTT delivery 18 crosses multiple networks, via the layers 22, 24, 26, 28, network quality of service (QOS) measurement services 36 have been deployed, primarily in the cloud, to evaluate how the network 10, especially cloud services, commercial Content Delivery Network (CDN), and Internet Service Provider (ISP) networks, are performing.

However, these network measurements are purely in aggregate and do not enable the provider or any of the delivery network 10 to understand the user quality of experience. For example, if a user called to complain about a particular OTT video's delivery, until recently, there was no mechanism for the content provider or any of the delivery networks to understand what experience that exact OTT video session had experienced. Recently, some video players have had the quality of experience measurement transmission integrated into a cloud computing system to create a database of the user video session experiences and to analytically analyze that user QOE data 38.

In various exemplary embodiments, a quality/economics optimization platform 40 completes the feedback cycle by taking the aggregate and individual QOE data 38 measurements and analyzes them to understand how to obtain a target level of OTT video publishing and/or delivery quality and revenue with the lowest cost. The platform 40 continuously adapts to OTT video publishing and/or network state to adjust the cost versus quality/revenue equation.

The platform 40 can interface to various components in the network 10 via Application Programming Interfaces (APIs). Specifically, the platform 40 can receive service and aggregate user QOE information from the QOE data 38 and the platform 40 can receive network service quality from the QOS measurements 36. The platform 40 can provide video publishing and CDN decisions to the platform 32. Further, the platform 40 can interface to the management plane 30 for video delivery network configuration decisions and to receive network state updates. These APIs allow the platform 40 to identify the resources allocated to OTT content delivery, the resources which could be allocated to OTT content delivery, the state of the OTT content delivery networking and publishing solution, and the quality of service and user quality of experience that is measured with the current network state in the network 10. Further, where the network orchestration, control, and management plane 30 lacks key adaptive capabilities, it may be necessary for the platform 40 to interface directly with any device or function in the network 10.

The platform 40 operates on the principle that the optimal state for the OTT content is one where QOE, revenue, and cost (e.g., capital expense (CAPEX), operating expense (OPEX), and/or administrative values) are optimized in accordance with policy. The platform 40 leverages policy and preconfigured cost and revenue information to process the target User QOE, compare against policy, evaluate alternative resource and software configurations in the network 10, and adjust the state of the OTT video delivery network 10 and the OTT video publishing functions of the OVP to achieve the target QOE with the minimal cost/maximum revenue.

In essence, the platform 40 is a series of APIs and an analytics engine operating on a processing apparatus. The analytics engine is driven by a variety of processes to trade off some or all components of OTT content delivery elements and OTT content publishing elements based on an evaluation of their revenue generation, cost, resource use, function, risk, location, impact on user QOE, and other attributes.

By analyzing the User QOE and/or the network QOS data in the context of the network 10 and OVP state, the analytics engine in the platform 40 can decide whether to increase, reduce, or maintain the resources used for OTT content delivery in the network 10. An increased investment would be targeted at increasing resources in the manner that is most effective to increase QOE and/or Revenue with the lowest cost. Similarly, reducing the resources would evaluate the network 10 in the context of minimizing the QOE and revenue impact but delivering the greatest savings. Typically, components of the solution that are overwhelmed or dysfunctional would be obvious areas for the platform 40 to invest in to improve the QOE with minimal cost impact. Underutilized areas of the network 10 or OVP solution would be obvious areas to reduce the overall solution cost.

Thus, by introducing the platform 40 with the analytics engine with QOE and economic policy based decision making centered around user QOE, network QOS, OVP state, and network state can deliver a more cost optimized OTT content publishing and delivery solution. When network configuration actions can be communicated to the network 10 or OVP elements quickly through a near real-time management solution, SDN, NFV, and/or orchestration, the platform 40 will enable near real-time adjustments to fix publishing and delivery solutions and continuously adjust the user QOE to be in line what the QOE and economics policy. This ensures a stronger QOE, high performance, and cost efficiency.

Quality of Experience (QOE)

Again, QOE is a measure of a customer's experiences with a service, i.e., the OTT content. QOE focuses on the entire service experience and is a more holistic evaluation than the more narrowly focused user experience (focused on a software interface) and customer-support experience (support focused). Recently, new QOE solutions have emerged that deliver user session specific detail by integrating functionality into the client video player (client) which may be coupled with key information from the content provider. This QOE detail may be provided through events, measurements, and the environment detected through the client or content provider. The QOE detail is often analyzed and provided to the content provider and/or delivery network providers. Forums like the Streaming Video Alliance (SVA) and the Consumer Technology Association (CTA) are forming best practices and standardizing on these metrics, events and environmental variables provided by QOE solutions. Examples of such metrics and events include the following:

| delivered bitrate | labeled bitrate | player resolution |
|---|---|---|
| buffer length (current & max) | re-buffering ratio | interruptions ratio |

| | | |
|---|---|---|
| player errors | network type | network signal strength |
| player state | exit before video count | exit before video start ratio |
| video start time | video start failure | master manifest URL |
| variant manifest URL | play failure count | play failure ratio |
| In-stream failure count | play head time | bytes downloaded |
| throughput | sleep | Shutdown |
| geolocation | streaming server IP Address | client IP address |
| Closed caption/ Subtitle quality | CPU utilization | GPU utilization |
| memory utilization | VPN presence | CDN node type |
| CDN edge server IP address | Server Redirection | VPN presence |
| OS version | Browser info | |

Example Network

Figure 2:
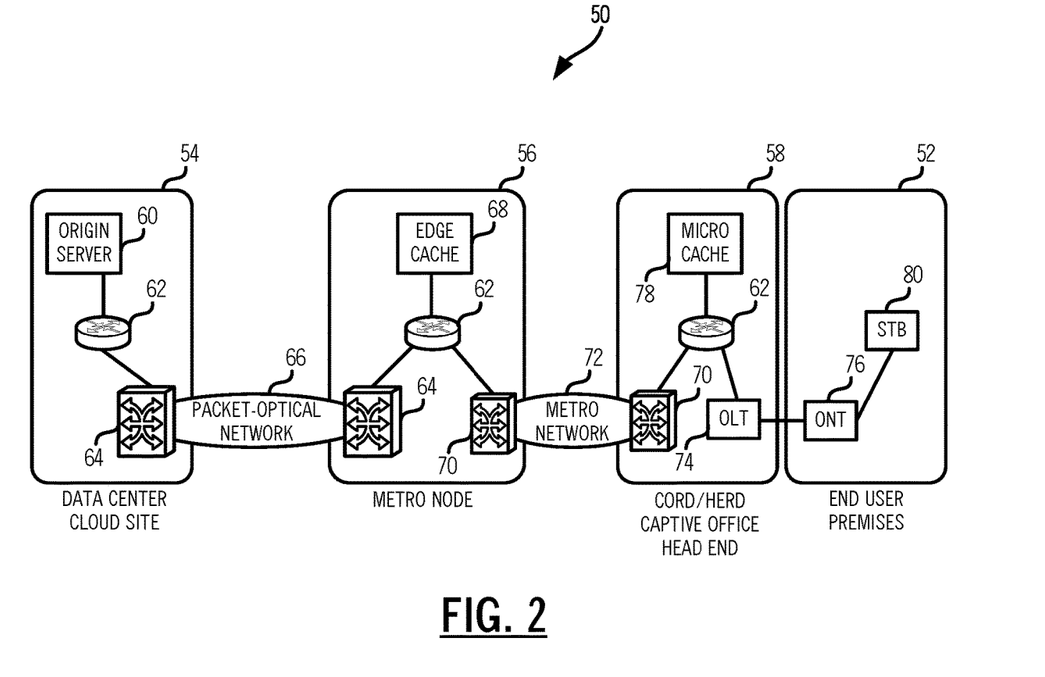
FIG. 2 is a network diagram of a network illustrating content distribution to an end user.

Referring to FIG. 2, in an exemplary embodiment, a network diagram illustrates a network 50 illustrating content distribution to an end user 52. The network 50 provides additional details of the components in the network 10. Specifically, the network 50 illustrates one exemplary configuration to deliver an OTT content stream to the end user 52. Components in the network 50 can include a data center/cloud site 54, a metro node 56, a captive office/head end 58, and the end user 52. The data flow for the OTT content is from the site 54 through the metro node 56 and the head end 58 to the end user 52. The site 54 can include an origin server 60 hosting the OTT content, one or more routers/switches 62, and a network element 64. The origin server 60 provides the OTT content through the one or more routers/switches 62 to the network element 64. The one or more routers/switches 62 can provide higher layer connectivity (L2 and above) and the network element 64 can provide L0, L1, L2, and/or L3 connectivity to a packet-optical network 66.

The packet-optical network 66 provides long haul, regional connectivity between the site 54 and the metro node 56. The metro node 56 provides metro connectivity and includes the network element 64 interfacing to the packet-optical network 66. The metro node 56 can include an edge cache 68 for locally caching OTT content from the origin server 60. Specifically, the edge cache 68 can deliver the OTT content to avoid connectivity or the latency of the packet-optical network 66. This edge cache 68 and even the micro cache 78 may be a set of devices and functions including reverse proxy, firewall, content caching, load balancing, dynamic ad insertion, personalization, packet switching, routing, etc. The metro node 56 includes a network element 70 interfacing a metro network 72. The metro network 72 is similar to the packet-optical network 66 albeit optimized to the metro scale. The metro node 56 includes the one or more routers/switches 62 interconnecting the edge cache 68 and the network elements 64, 70.

The head end 58 includes the network element 70 interfacing the metro network 72. In an exemplary embodiment, the head end 58 includes an Optical Line Terminal (OLT) 74 which can be part of a Passive Optical Network (PON) interfacing an Optical Network Terminal (ONT) 76 at or near the end user 52. The head end 58 can further include a micro cache 78 which can locally cache the OTT content at the head end 58. The one or more routers/switches 62 at the head end 58 can connect the network element 70 to the OLT 74. The caches 68, 78 are used to reduce upstream network bandwidth and reduce latency for OTT content by storing some content, such as based on demand, locally to reduce requests back to the origin server 60. At the end user 52, a Set Top Box 80 or equivalent is communicatively coupled to the ONT 76 for receiving the OTT content.

Those of ordinary skill in the art will recognize the network 50 is presented for illustration purposes, and the network 50 can include other network technologies, configurations, etc. For example, the end user 52 in the network 50 is shown using PON and the STB 80, but other access technologies are also contemplated, such as cable modems, wireless, etc. Also, the STB 80 could be replaced with a user device which accesses the OTT content, such as over a local wireless network. Of course, various embodiments are contemplated for the networks 10, 50.

Optimization Method and Platform

Figure 3:
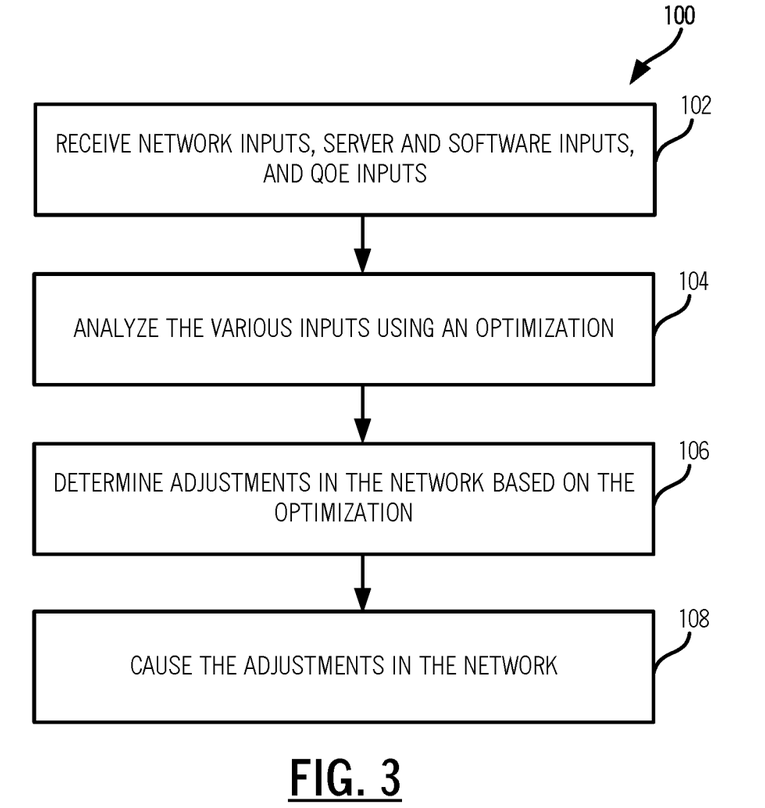
FIG. 3 is a flowchart of an OTT content optimization method implementable via the optimization platform.

Referring to FIG. 3, in an exemplary embodiment, a flowchart illustrates an OTT content optimization method 100 implementable via the optimization platform 40. Again, the optimization platform 40 has connectivity to the network 10, 50, such as via various APIs, and an analytics engine to perform optimization, to tweak/adjust the network 10, 50 based on various inputs including QOE data. The optimization method 100 includes receiving network inputs, server and software inputs, and QOE inputs (step 102). The network inputs are from any of the optical layer 22, the packet layer 24, and/or the compute layer 26. That is, the network inputs are from any physical or virtual network elements, from the management plane 30, or the like. Example network inputs include the following for both physical and virtual network elements:

Topology
link state
port and logical port utilization
link and nodal latency
Jitter
by port and logical port transmitted, received, errored and discarded frames and bytes
memory utilization
Central Processing Unit (CPU) utilization
network or resource congestion
power utilization
system and card temperatures
device attributes for physical and virtual nodes The server and software inputs can be from the video functions layer 28 and/or the NFVI layer 26. Example server and software inputs include the following:

Virtual Machine (VM)/container state
disk capacity, quota, and utilization
CPU/Graphics Processing Unit (GPU) utilization and quota
system temperature
disk integrity
disk type
Operating System (OS)
power utilization
application state and attributes The QOE inputs can be from the QOE data 38. Example QOE inputs include the following:

| | |
|---|---|
| delivered bitrate | labeled bitrate |
| buffer length (current & max) | re-buffering ratio |
| interruptions ratio | player errors |
| client network type | client network signal strength |
| player state | exit before video count |
| exit before video start ratio | video start time |
| video start failure | master manifest Uniform Resource Locator (URL) |

| | |
|---|---|
| variant manifest URL | play failure count |
| play failure ratio | In-stream failure count |
| play head time | bytes downloaded |
| throughput | client active/idle/sleep/shutdown state |
| client geolocation | streaming server Internet Protocol (IP) Address |
| client IP address | Closed caption/Subtitle quality |
| Client CPU utilization | Client GPU utilization |
| memory utilization | Virtual Private Network (VPN) presence |
| CDN node type | CDN edge server IP address |
| Server Redirection | Operating System (OS) |
| OS version | Browser info |

With the inputs, the OTT content optimization method 100 analyzes the various inputs using an optimization (step 104), determines adjustments in the network 10, 50 based on the optimization (step 106), and causes the adjustments in the network 10, 50 (step 108). The OTT content optimization method 100 can be implemented continuously, on demand, or periodically. The intent of the optimization is to review and analyze all of the inputs including the QOE inputs and determine adjustments in the network 10, 50 accordingly. The adjustments can be based on reducing cost, improving quality (QOE), and the like based on various tradeoffs.

The OTT content optimization method 100 can continuously and/or periodically receive the inputs and maintain historical values of the inputs. Also, the OTT content optimization method 100 can have forecasted use of OTT content. Further, the OTT content optimization method 100 can have user defined inputs such as costs, location, etc. Based on the current inputs, the historical inputs, the forecasted use, and the user defined inputs, the OTT content optimization method 100 performs a qualitative evaluation of various tradeoffs to determine network adjustments.

In an exemplary embodiment, the optimization is performed for the following qualitative evaluations:

QOE/Bandwidth trade-offs by qualitative evaluation, forecasted use, cost, and/or location
QOE/Revenue trade-offs by qualitative evaluation, forecasted use, cost, and/or location
QOE/CPU/GPU trade-offs by qualitative evaluation, forecasted use, cost, and/or location
QOE/Memory trade-offs by qualitative evaluation, forecasted use, cost, and/or location
QOE/Cost trade-offs by qualitative evaluation, forecasted use, cost, and/or location
QOE/Latency trade-offs by qualitative evaluation, forecasted use, cost, and/or location
Device reliability/Revenue trade-offs by forecasted evaluation, use, cost, and/or location
Bandwidth/Storage trade-offs by forecasted use, cost, and/or location
CPU/GPU/Storage trade-offs by forecasted use, cost, and/or location
CPU/GPU/Bandwidth trade-offs by forecasted use, cost, and/or location
Re-encoding of corrupted encoded files by cost, forecasted popularity, and/or location The adjustments in the network 10, 50 can be adjusting existing services in the network 10, 50 as well as provisioning new services. The OTT content optimization method 100 contemplates the adjustment in one or more of the layers 22, 24, 26, 28. The following lists exemplary actions which the platform 40 can implement to cause adjustments in the network 10, 50 based on the optimization:

Logical or physical, packet or optical, Link/Port bandwidth adjustment
provisioning of new packet and/or optical network connections
optical or packet traffic rerouting
virtual machine/container memory quota adjustment
virtual machine/container memory quota
new virtual machine/container deployment
server redirection/substitution
content caching/placement request
content re-encoding
content access modification
operator alerts
altered personalization and advertisement attributes
payment adjustments
end user notification
CDN notification
CDN switching
device isolation The optimization platform 40 and the OTT content optimization method 100 can adjust any of the components in the network 10, 50 from the content publishing 16, the content delivery 18, and the content viewing 20. That is, from the origin server 60 to the end user 52, including all of the data center, core, metro, edge, and end user premises equipment in between.

Figure 4:
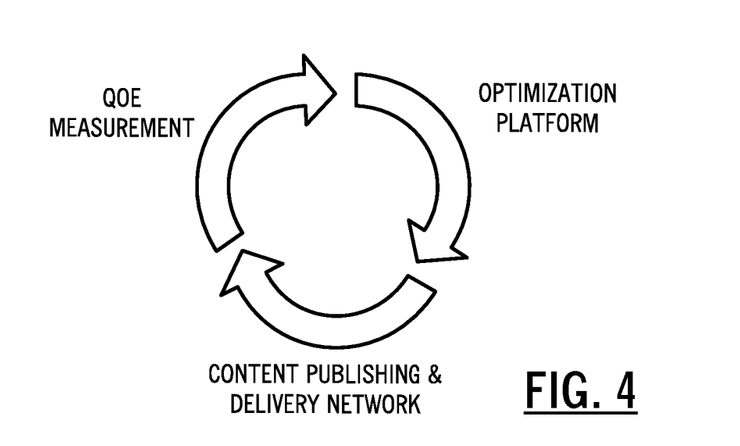
FIG. 4 is a diagram of a feedback loop formed between the QOE data, the optimization platform, and the network components for OTT content publishing and delivery.

Referring to FIG. 4, in an exemplary embodiment, a diagram illustrates a feedback loop formed between the QOE data 38, the optimization platform 40, and the network 10, 50 components for OTT content publishing and delivery. Again, while OTT video has been in existence for a while, the ability to measure the end user QOE by video stream is new. To date, there has been nothing to complete the feedback loop to the network 10, 50. Again, the optimization platform 40 analyses the current user QOE against a set of policies that define the desired quality of experience. Note, the optimization platform 40 and the OTT content optimization method 100 can be implemented on individual user streams and their QOE, groups of user streams and either their aggregate QOE or a representative stream's QOE, or the like.

Once the analysis is complete, if the user QOE (an individual stream QOE, a representative stream QOE, or an aggregate QOE for a group of streams) is less than a target, the optimization platform 40 and the OTT content optimization method 100 will evaluate potential network causes for the discrepancy and pursues alternative network configurations, based on policies defined by the network operator. If better QOE would result from an alternate network configuration and/or if an action is necessary because of the analysis (e.g., SLA penalty), the optimization platform 40 and the OTT content optimization method 100 recommend and/or causes this change or action from the network operator.

This feedback loop can be fully automated by using APIs to suggest network changes to the network orchestration, control, and management components of the network 10, 50 instead of relying on network operator administration to make changes. This would convert the recommendations above to automated and adaptive network actions.

The feedback loop can further be extended to include OVP functions by including the OVP components and their software, storage, and hardware resource components in the analysis of the QoE and the potential causes of poor quality of experience. The optimization platform 40 and the OTT content optimization method 100 could then recommend configuration changes and/or actions from the operator, the OVP, and/or the network orchestrator, control, and management components. One of many potential scenarios is to identify a popular improperly encoded file on a cache, have that file deleted and bandwidth to the origin server 60 temporarily increased until encapsulation is regenerated and the caching of the popular content stabilizes.

Further, the optimization platform 40 and the OTT content optimization method 100 can evaluate cost information in the analysis. This is performed by adding a set of policies that allow the operator to define cost and revenue. The cost and revenue policies are leveraged to optimize the current and potential network and/or the OVP states that could potentially lead to the target QOE with an aim to maximize the revenue, minimize the cost and achieve the target QOE.

In an exemplary embodiment, a process for adaptive Over-the-Top (OTT) content optimization based on Quality of Experience (QOE) is implemented in an OTT optimization platform communicatively coupled to a plurality of devices in a network. The process includes receiving a plurality of inputs including network inputs, service and software inputs, and QOE inputs; analyzing the plurality of inputs with respect to one or more OTT content streams to perform an optimization thereof; determining adjustments in the network based on the optimization; and one of notifying a network operator of the adjustments and automatically causing the adjustments in the network.

The network can include a plurality of an optical layer, a packet layer, a compute layer, and a video functions layer, and wherein the adjustments can include changes to one or more of i) network elements in the optical layer, ii) network elements in the packet layer, iii) virtual network elements in the NFVI, and iv) compute resources in the video functions layer. The network inputs and the service and software inputs can be received from a management plane, and wherein the QOE data can be received from a database which manages the QOE data from players associated with user devices. The network can include a combination of OTT delivery elements to end users and OTT content publishing elements to provide the OTT content streams to the network, and wherein the optimization can include evaluating tradeoffs for configured of the OTT delivery elements and the OTT content publishing elements based off a plurality of factors including revenue generation, cost, resource use, function, risk, location, and impact on user QOE.

The receiving can be via one or more Application Programming Interfaces (APIs) from a management plane associated with the network or directly from the network itself. The QOE inputs can be related to one of an individual OTT content stream to a user, a selected representative OTT content stream to a selected user amongst a group of users associated with a corresponding group of OTT content streams, and an aggregate QOE for the group of OTT content streams, and wherein the adjustments can correspond to one of the individual OTT content stream and the group of OTT content streams. The adjustments can include a determination of caching in the network based on the OTT content to improve the QOE inputs.

The determining can include a determination of a particular file for OTT content is improperly encoded on a cache., and wherein the adjustments can include deletion of the file and an increase of bandwidth back to an origin server until caching of the file stabilizes. The method of claim 1, wherein the optimization can include an evaluation of various tradeoffs to determine the adjustments, and wherein the evaluation can be based on the receiving, historical inputs, forecasted use, and user defined inputs. The tradeoffs can be based on QOE versus one or more of compute resources, bandwidth, latency, and encoding of the OTT content. The QOE data can be consolidated by a system receiving feedback from a plurality of players associated with user devices consuming the OTT content.

Optimization Examples

Again, the optimization is performed on a single OTT content stream or a group of OTT content streams. The following illustrate some non-limiting examples of the optimization performed by the optimization platform 40 and/or the OTT content optimization method 100. For example, where the QOE data identifies n+ (where n is defined in policy) users impacting QOE issues, and all of the n+ users are sourced from caches located in the same location running at higher than normal CPU levels, the optimization platform 40 can spin up new instances of caches in that location along with the appropriate changes or instantiations of load balancers, firewalls, and routing/switching NFV functions to spread the high load amongst a greater number of caches.

Also, where QOE measurements identify n+ (where n is defined in policy) flows with user impacting issues, the optimization platform 40 can use the detailed flow information to map out the path that flow would traverse over the network topology and examine each of the network and compute components along the path. It could then identify network anomalies. For example, it might recognize unusually high latency for flows over a path and reoptimize the network to put the video flows on a lower latency path. For example, the optimization platform 40 might recognize unusual intermittent packet drop for flows over a network link and could perform various actions.

First, the various actions could include, where different networks (e.g., video, Internet, business) are overlaid on the same infrastructure with individual bandwidth quotas, the optimization platform 40 could adjust the video network to have a higher bandwidth quota. Second, where there is an open consumption model, the optimization would look at increasing the bandwidth quota, if possible. If not possible, it could example the network resources available to to add bandwidth to the network by creating new wavelengths, Link Aggregation Group (LAG) groups, Multiprotocol Protocol Label Switching (MPLS) Label Switched Paths (LSPs), etc. and their associated buffer, queuing, and like characteristics along the constrained path.

Third, where IP QOS is active or configurable, the optimization could adjust the discard eligibility and emission priorities for the video to be more favorable. Fourth, where MPLS is available, the optimization could use MPLS to traffic engineer the flow around the congestion point. The optimization platform 40 could also reroute users to a different cache, away from the congestion. The optimization platform 40 could analyze all of the aforementioned options and any other options that apply to select the least cost effective solution.

The optimization platform 40 could periodically assess trends in QOE. If the optimization platform 40 recognizes a decreasing user QOE, the optimization platform 40 could identify the portions of the network and compute infrastructure that are most commonly associated with the users experiencing a QOE decline and revector resources to increase the QOE (as discussed above) to proactively prevent the QoE from crossing a policy defined threshold for minimum Quality of Experience. On the other hand, the optimization platform 40 could similarly reduce the resources associated with video QOE where QOE is well beyond the QOE policy to reduce the overall service cost. The optimization platform 40 could identify that optimization platform 40 issues for n+ users and map to the videos at the point of ad insertions and provision the OVP to turn off ad insertion or to use a statically defined ad while operators investigate the dynamic ads for corruption or connection issues.

The optimization platform 40 could periodically assess the cost tradeoff of bandwidth vs. storage while maintaining a QOE above a policy directed threshold. Making a large quantity of storage available for caching in the network allows for more content to be cached and thus less bandwidth would be required from upstream content sources. Similarly, making a large quantity of bandwidth available reduces the need for caching all but the most frequently requested content and thus less storage is required. The optimization platform 40 could look at its policy for the cost of storage versus the cost of bandwidth and couple with that the cache hit rates of the content being cached. The optimization platform 40 may determine that it could save costs by freeing up storage and/or adding caching and reverse proxy instances and boosting the bandwidth resources to the end user or redirecting them to another caching site due to content having a low cache hit rate. Similarly, if the optimization platform 40 found a high cache hit rate, it may determine that adding additional storage to existing cache and/or increasing the cache instances and reducing the available bandwidth would be more effective and less costly.

Exemplary Server

Figure 5:
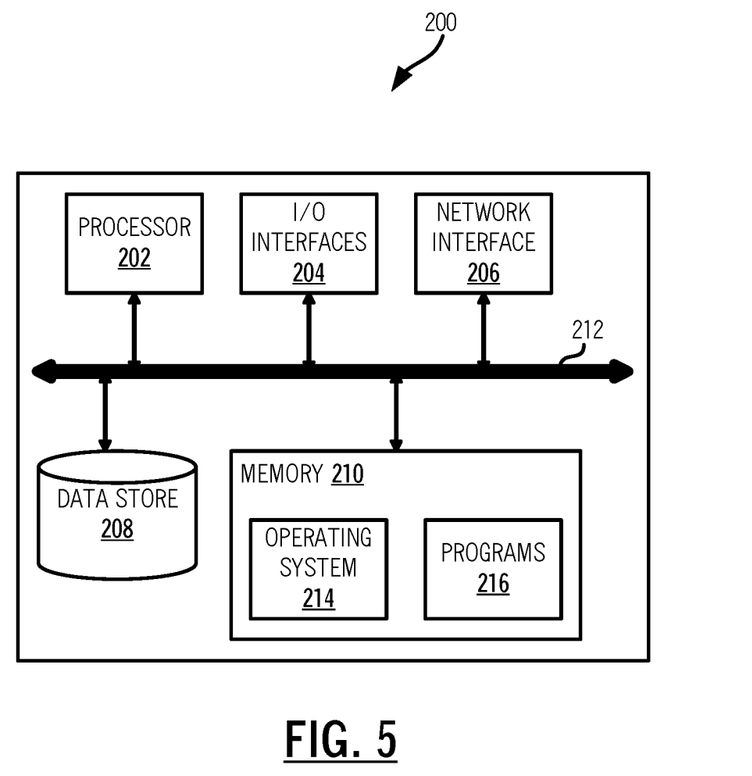
FIG. 5 is a block diagram of an exemplary implementation of a server, which can be used to implement the optimization platform and/or the OTT content optimization method.

Referring to FIG. 5, in an exemplary embodiment, a block diagram illustrates an exemplary implementation of a server 200, which can be used to implement the optimization platform 40 and/or the OTT content optimization method 100. The server 200 can be a digital processing device that, in terms of hardware architecture and functionality, generally includes a processor 202, input/output (I/O) interfaces 204, a network interface 206, a data store 208, and memory 210. It should be appreciated by those of ordinary skill in the art that FIG. 5 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 can be, for example, but not limited to, one or more buses or other wired or wireless connections, as is known in the art. The local interface 212 can have additional elements, which are omitted for simplicity, such as controllers, buffers (caches), drivers, repeaters, and receivers, among many others, to enable communications. Further, the local interface 212 can include address, control, and/or data connections to enable appropriate communications among the aforementioned components.

The processor 202 is a hardware device for executing software instructions. The processor 202 can be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 can be used to receive user input from and/or for providing system output to one or more devices or components. The network interface 206 can be used to enable the server 200 to communicate on a network.

The data store 208 can be used to store data. The data store 208 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 can incorporate electronic, magnetic, optical, and/or other types of storage media. The memory 210 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 can incorporate electronic, magnetic, optical, and/or other types of storage media. Note that the memory 210 can have a distributed architecture, where various components are situated remotely from one another, but can be accessed by the processor 202. The software in memory 210 can include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for adaptive Over-the-Top (OTT) content optimization based on Quality of Experience (QOE), the method comprising:
    in an OTT optimization platform operating on one or more servers communicatively coupled to a plurality of devices in a network, receiving a plurality of inputs comprising network inputs, service and software inputs, and QOE inputs, wherein the network operates at a plurality of layers, wherein the network includes a plurality of users operating a plurality of OTT content streams therein corresponding to the QOE inputs, and wherein the QOE inputs are from QOE data obtained from a plurality of players associated with user devices consuming associated OTT content streams;
    for a group of OTT content streams, determining associated QOE for the group of OTT content streams using a representative QOE for a representative OTT content stream that is for a selected user in the group of OTT content streams, wherein the representative QOE is determined from the QOE data obtained from associated players which is automatically measured during operation;
    analyzing the plurality of inputs and the associated QOE with respect to the group of OTT content streams to perform an optimization thereof;
    assessing trends in the associated QOE to identify previous periods of increased and decreased values of the associated QOE with respect to one or more threshold values for the associated QOE;
    mapping videos for one or more users at a point of ad insertion in the videos;
    determining adjustments in the network at one or more layers that include at least one of an optical layer and a Time Division Multiplexing (TDM) layer based on the optimization, wherein the adjustments are determined to improve the associated QOE for the group of OTT content streams, wherein the adjustments include increased resource allocation for periods associated with the previous periods of decreased values of the associated QOE and decreased resource allocation for periods associated with the previous periods of increased values of the associated QOE, and wherein the adjustments include determining whether to perform one of turning off ad insertion and using statically defined ads; and
    notifying a network operator of the adjustments and automatically causing the adjustments in the network.

2. The method of claim 1, wherein the network comprises a plurality of the optical layer, a packet layer, a compute layer, and a video functions layer, and wherein the adjustments comprise changes to one or more of i) physical and virtual network elements in the optical layer, ii) physical and virtual network elements in the packet layer, iii) servers and other compute elements in the compute layer, and iv) physical and virtual resources in the video functions layer.

3. The method of claim 1, wherein the network inputs and the service and software inputs are received from a management plane.

4. The method of claim 1, wherein the network comprises a combination of OTT delivery elements to end users and OTT content publishing elements to provide the OTT content streams to the network, and wherein the optimization comprises evaluating tradeoffs for the OTT delivery elements and the OTT content publishing elements based of a plurality of factors comprising revenue generation, cost, resource use, function, risk, location, and impact on user QOE.

5. The method of claim 1, wherein the receiving is via one or more Application Programming Interfaces (APIs) from a management plane associated with the network or directly from the network.

6. The method of claim 1, wherein the adjustments comprise a determination of caching in the network based on the OTT content to improve the QOE inputs.

7. The method of claim 1, wherein responsive to a determination of a particular file for OTT content is improperly encoded on a cache, the adjustments comprise deletion of the file and an increase of bandwidth back to an origin server until caching of the file stabilizes.

8. The method of claim 1, wherein the optimization comprises an evaluation of various tradeoffs to determine the adjustments, and wherein the evaluation is based on the receiving, and user defined inputs.

9. The method of claim 8, wherein the tradeoffs are based on QOE versus one or more of compute resources, bandwidth, latency, and encoding of the OTT content.

10. The method of claim 1, wherein the QOE data is consolidated by a system receiving feedback from a plurality of players associated with user devices consuming the OTT content.

11. An optimization platform adapted for Over-the-Top (OTT) content optimization based on Quality of Experience (QOE), the optimization platform comprising:
    a network interface communicatively coupled to a network with a plurality of devices and which operates at a plurality of layers, wherein the network includes a plurality of users operating a plurality of OTT content streams therein;
    a processor communicatively coupled to the network interface; and
    memory storing instructions that, when executed, cause the processor to
        receive a plurality of inputs comprising network inputs, service and software inputs, and QOE inputs from QOE data obtained from a plurality of players associated with user devices consuming associated OTT content streams,
        for a group of OTT content streams, determine associated QOE for the group of OTT content streams using one of a representative QOE for a representative OTT content stream that is for a selected user in the group of OTT content streams, wherein the representative QOE is determined from the QOE data obtained from associated players which is automatically measured during operation, analyze the plurality of inputs and the associated QOE with respect to the group of OTT content streams to perform an optimization thereof, assess trends in the associated QOE to identify previous periods of increased and decreased values of the associated QOE with respect to one or more threshold values for the associated QOE, map videos for one or more users at a point of ad insertion in the videos, determine adjustments in the network at one or more layers that include at least one of an optical layer and a Time Division Multiplexing (TDM) layer based on the optimization, wherein the adjustments are determined to improve the associated QOE for the group of OTT content streams, wherein the adjustments include increased resource allocation for periods associated with the previous periods of decreased values of the associated QOE and decreased resource allocation for periods associated with the previous periods of increased values of the associated QOE, and wherein the adjustments include determining whether to preform one of turning off ad insertion and using statically defined ads, and notify a network operator of the adjustments and automatically cause the adjustments in the network.

12. The optimization platform of claim 11, wherein the network comprises a plurality of the optical layer, a packet layer, a compute layer, and a video functions layer, and wherein the adjustments comprise changes to one or more of i) physical and virtual network elements in the optical layer, ii) physical and virtual network elements network elements in the packet layer, iii) compute resources in the compute, and iv) physical video relevant appliances or video virtual functions in the video functions layer.

13. The optimization platform of claim 11, wherein the network inputs and the service and software inputs are received from a management plane.

14. The optimization platform of claim 11, wherein the network comprises a combination of OTT delivery elements to end users and OTT content publishing elements to provide the OTT content streams to the network, and wherein the optimization comprises evaluating tradeoffs for the OTT delivery elements and the OTT content publishing elements based of a plurality of factors comprising revenue generation, cost, resource use, function, risk, location, and impact on user QOE.

15. The optimization platform of claim 11, wherein the receiving is via one or more Application Programming Interfaces (APIs) from a management plane associated with the network.

16. The optimization platform of claim 11, wherein the optimization comprises an evaluation of various tradeoffs to determine the adjustments, and wherein the evaluation is based on the receiving, and user defined inputs.

17. The optimization platform of claim 11, wherein the QOE data is consolidated by a system receiving feedback from a plurality of players associated with user devices consuming the OTT content.

18. A non-transitory computer readable medium comprising instructions executable by a processor, and in response to such execution causes the processor to perform operations comprising:

from a network with a plurality of devices and which operates at a plurality of layers, receiving a plurality of inputs comprising network inputs, service and software inputs, and QOE inputs, wherein the network includes a plurality of users operating a plurality of OTT content streams therein corresponding to the QOE inputs, and wherein the QOE inputs are from QOE data obtained from a plurality of players associated with user devices consuming associated OTT content streams;

for a group of OTT content streams, determining associated QOE for the group of OTT content streams using a representative QOE for a representative OTT content stream that is for a selected user in the group of OTT content streams, wherein the representative QOE is determined from the QOE data obtained from associated players which is automatically measured during operation;

analyzing the plurality of inputs with respect to the group of OTT content streams to perform an optimization thereof;

assessing trends in the associated QOE to identify previous periods of increased and decreased values of the associated QOE with respect to one or more threshold values for the associated QOE;

mapping videos for one or more users at a point of ad insertion in the videos;

determining adjustments in the network at one or more layers that include at least one of an optical layer and a Time Division Multiplexing (TDM) layer based on the optimization, wherein the adjustments are determined to improve the associated QOE for the group of OTT content streams, wherein the adjustments include increased resource allocation for periods associated with the previous periods of decreased values of the associated QOE and decreased resource allocation for periods associated with the previous periods of increased values of the associated QOE, and wherein the adjustments include determining whether to perform one of turning off ad insertion and using statically defined ads; and notifying a network operator of the adjustments and automatically causing the adjustments in the network.

* * * * *